US 11,726,595 B2

(12) United States Patent
Song et al.

(10) Patent No.: US 11,726,595 B2
(45) Date of Patent: Aug. 15, 2023

(54) TOUCH DISPLAY APPARATUS

(71) Applicant: LG Display Co., Ltd., Seoul (KR)

(72) Inventors: Min Seob Song, Paju-si (KR); Sang Woo Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/976,104

(22) Filed: Oct. 28, 2022

(65) Prior Publication Data

US 2023/0214035 A1 Jul. 6, 2023

(30) Foreign Application Priority Data

Dec. 31, 2021 (KR) .................. 10-2021-0194780

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04164* (2019.05)

(58) Field of Classification Search
None
See application file for complete search history.

(56) References Cited

U.S. PATENT DOCUMENTS

| 2017/0357353 | A1* | 12/2017 | Katsuta | G06F 3/04164 |
| 2020/0057530 | A1 | 2/2020 | Moon et al. | |
| 2020/0235172 | A1* | 7/2020 | Lee | H10K 50/15 |
| 2020/0293150 | A1* | 9/2020 | Jeong | G06F 3/0446 |
| 2020/0401274 | A1* | 12/2020 | Moon | G06F 3/0445 |
| 2021/0011602 | A1 | 1/2021 | Song et al. | |
| 2021/0255738 | A1 | 8/2021 | Kim et al. | |
| 2021/0357080 | A1* | 11/2021 | Lee | G06F 3/0412 |

OTHER PUBLICATIONS

European Patent Office, Extended European Search Report and Opinion, EP Patent Application No. 22205585.7, dated May 3, 2023, ten pages.

* cited by examiner

*Primary Examiner* — Krishna P Neupane

(74) *Attorney, Agent, or Firm* — Fenwick & West LLP (57) ABSTRACT

A touch display apparatus is provided. The touch display apparatus may include a touch sensor on an encapsulating unit covering light-emitting devices. The touch sensor may include touch electrodes and bridge electrodes electrically connecting between the touch electrodes. Each of the touch electrodes may be electrically connected to the corresponding touch pad by one of touch routing lines. A guard line may be disposed between the touch electrodes and each touch routing line. A signal applied to the guard line may be different from a signal applied to adjacent touch routing line. Thus, in the touch display apparatus, a reduction in touch sensitivity due to a touch driving signal or a touch sensing signal applied by the touch routing lines may be prevented or at least reduced.

20 Claims, 6 Drawing Sheets

TOUCH DISPLAY APPARATUS

CROSS-REFERENCE TO RELATED APPLICATION

This application claims the benefit of Republic of Korea Patent Application No. 10-2021-0194780, filed on Dec. 31, 2021, which is hereby incorporated by reference in its entirety.

BACKGROUND

Field of Technology

The present disclosure relates to a touch display apparatus in which a touch sensor is disposed on an encapsulating unit covering light-emitting devices.

Discussion of the Related Art

Generally, a display apparatus provides an image to user. For example, the display apparatus may include a plurality of light-emitting device. Each of the light-emitting devices may emit light displaying a specific color. For example, each of the light-emitting devices may include a light-emitting layer disposed between a first emission electrode and a second emission electrode.

The display apparatus may perform a specific program or apply a specific signal by a touch of user and/or a tool. For example, the display apparatus may be a touch display apparatus including a touch sensor. The touch sensor may be disposed on an encapsulating unit covering the light-emitting devices. For example, the touch sensor may include touch electrodes disposed on the encapsulating unit and bridge electrodes electrically connecting between the touch electrodes.

Each of the touch electrodes may be electrically connected to the corresponding touch pad by one touch routing line from touch routing lines. A signal generated by the touch of the user and/or the tool may transmit through the touch routing line electrically connected to the corresponding touch electrode. For example, a touch driving signal or a touch sensing signal may be applied to each touch routing line.

The touch routing lines may extend along an edge of a display area in which the light-emitting devices are disposed. The touch electrodes may be disposed side by side on the encapsulating layer of the display area. Thus, in the touch display apparatus, the touch electrodes disposed close to the touch routing lines may be affected by the touch driving signal or the touch sensing signal applied by the touch routing lines. Therefore, in the touch display apparatus, a signal by the touch of the user and/or the tool may be distorted by the touch driving signal and/or the touch sensing signal applied by each touch routing line.

SUMMARY

Accordingly, the present disclosure is directed to a touch display apparatus that substantially obviates one or more problems due to limitations and disadvantages of the related art.

An object of the present disclosure is to provide a touch display apparatus capable of accurately sensing the touch of the user and/or the tool.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the present disclosure, as embodied and broadly described herein, there is provided a touch display apparatus comprising: a device substrate including a display area and a pad area; a plurality of light-emitting devices on the display area of the device substrate; an encapsulating layer on the device substrate, the encapsulating layer on the plurality of light-emitting devices; a touch sensor on the encapsulating layer, the touch sensor including a plurality of driving touch lines extending in a first direction and a plurality of sensing touch lines extending in a second direction that is different from the first direction; a plurality of driving routing lines each connecting a corresponding one of the plurality of driving touch lines to a corresponding touch pad from a plurality of touch pads that are on the pad area; a plurality of sensing routing lines each connecting a corresponding one of the plurality of sensing touch lines to a corresponding touch pad from the plurality of touch pads; a first driving guard line between the display area and the plurality of driving routing lines, the first driving guard line applied a signal that is a same as a signal applied to the plurality of sensing touch lines; and a first sensing guard line between the display area and the plurality of sensing routing lines, the first sensing guard line applied a signal that is a same as a signal applied to the plurality of driving touch lines.

In one embodiment, a touch display apparatus comprises: a substrate including a display area and a pad area; a plurality of pads in the pad area, the plurality of pads including a first pad and a second pad; a plurality of light-emitting devices on the display area; a touch sensor on the display area, the touch sensor including a first touch electrode line in a first direction and a second touch electrode line in a second direction that is different from the first direction; a first routing line connected to the first touch electrode line at a first side of display area, the first routing line transmitting a first signal between the first touch electrode line and the first pad; a second routing line connected to the second touch line at a second side of display area that is opposite first side, the second routing line transmitting a second signal that is different from the first signal between the second routing line and the second pad; and a first guard line between the first side of the display area and the first routing line, the first guard line supplied with a third signal that substantially matches the second signal.

In one embodiment, a touch display apparatus comprises: a substrate including a display area; a transistor on the display area; a light emitting device on the display area, the light emitting device electrically connected to the transistor; a touch sensor on the light emitting element, the touch sensor configured to sense touch of the touch display apparatus; a first routing line connected to the touch sensor, the first routing line configured to apply a touch driving signal to the touch sensor; a second routing line connected to the touch sensor, the second routing line configured to receive a touch sensing signal from the touch sensor; and a guard line that intersects one of the first routing line or the second routing line and is applied a signal that substantially matches one of the touch driving signal or the touch sensing signal, the guard line including a same material as at least part of the touch sensor.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

And, unless 'directly' is used, the terms "connected" and "coupled" may include that two components are "connected" or "coupled" through one or more other components located between the two components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 1:
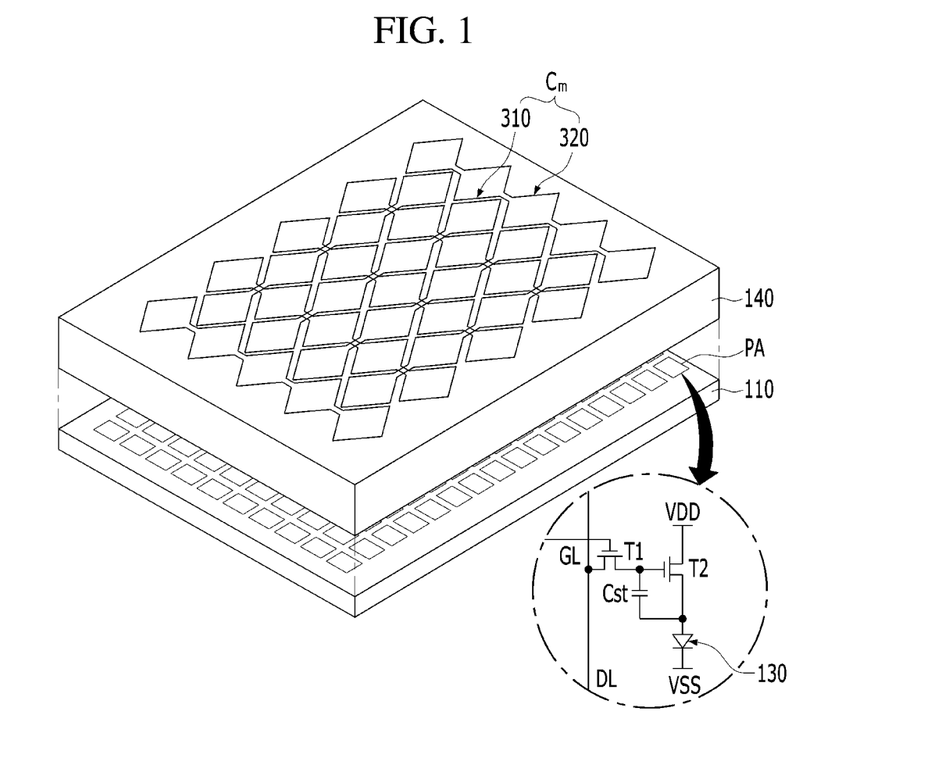
FIGS. 1 and 2 are views schematically showing a touch display apparatus according to an embodiment of the present disclosure.
Figure 2:
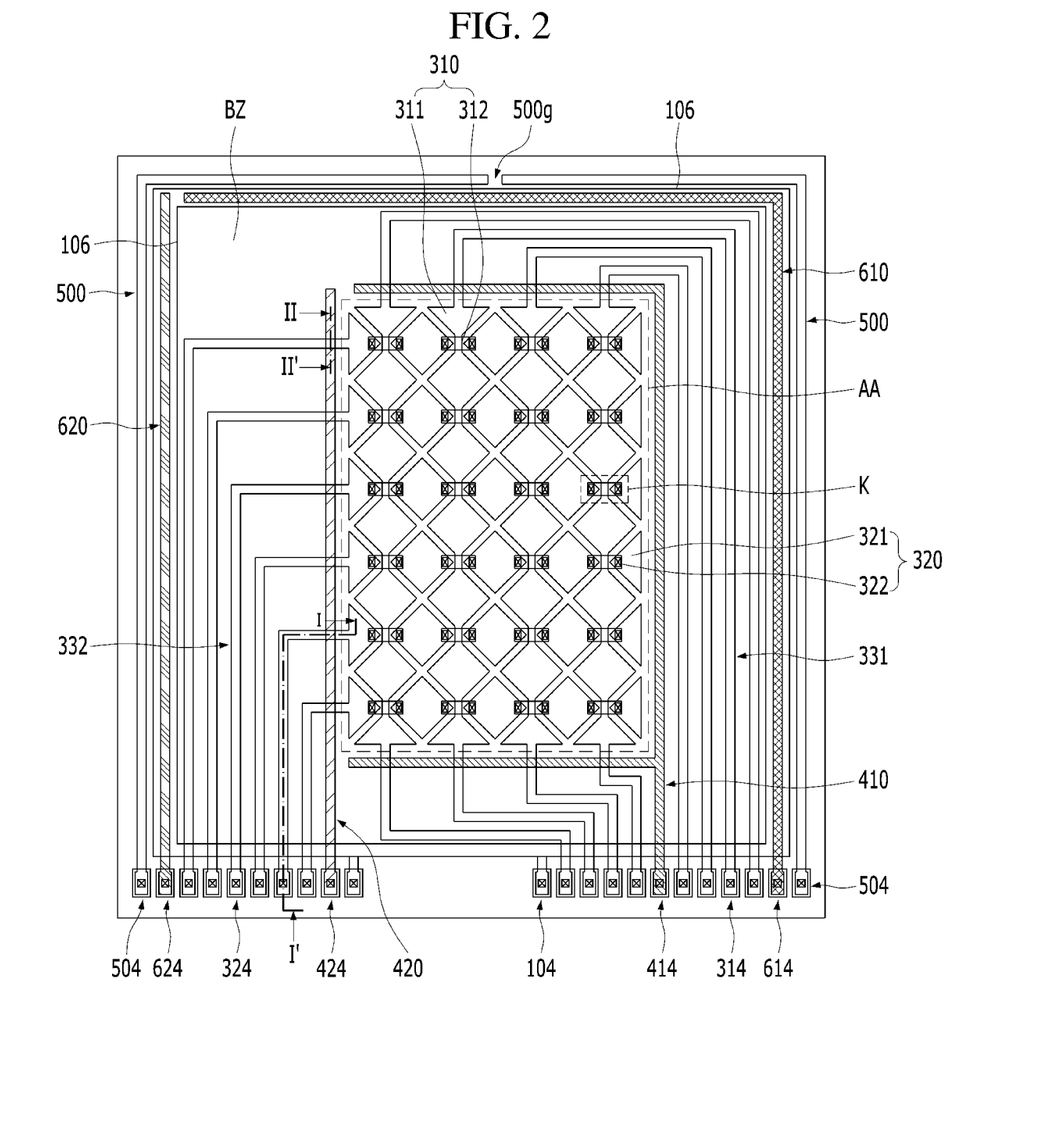
Figure 3:
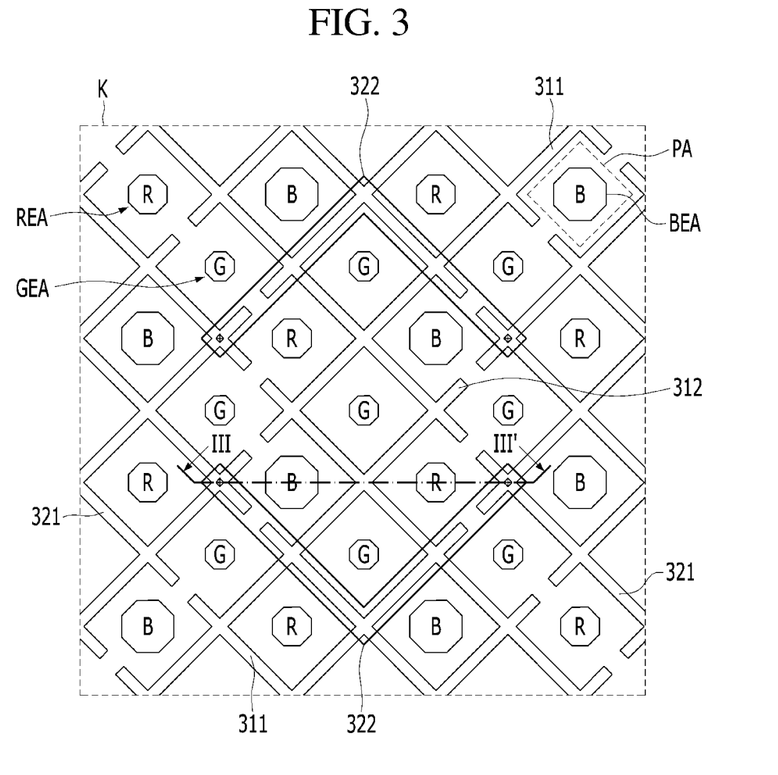
FIG. 3 is an enlarged view of K region in FIG. 2 according to an embodiment of the present disclosure.
Figure 4:
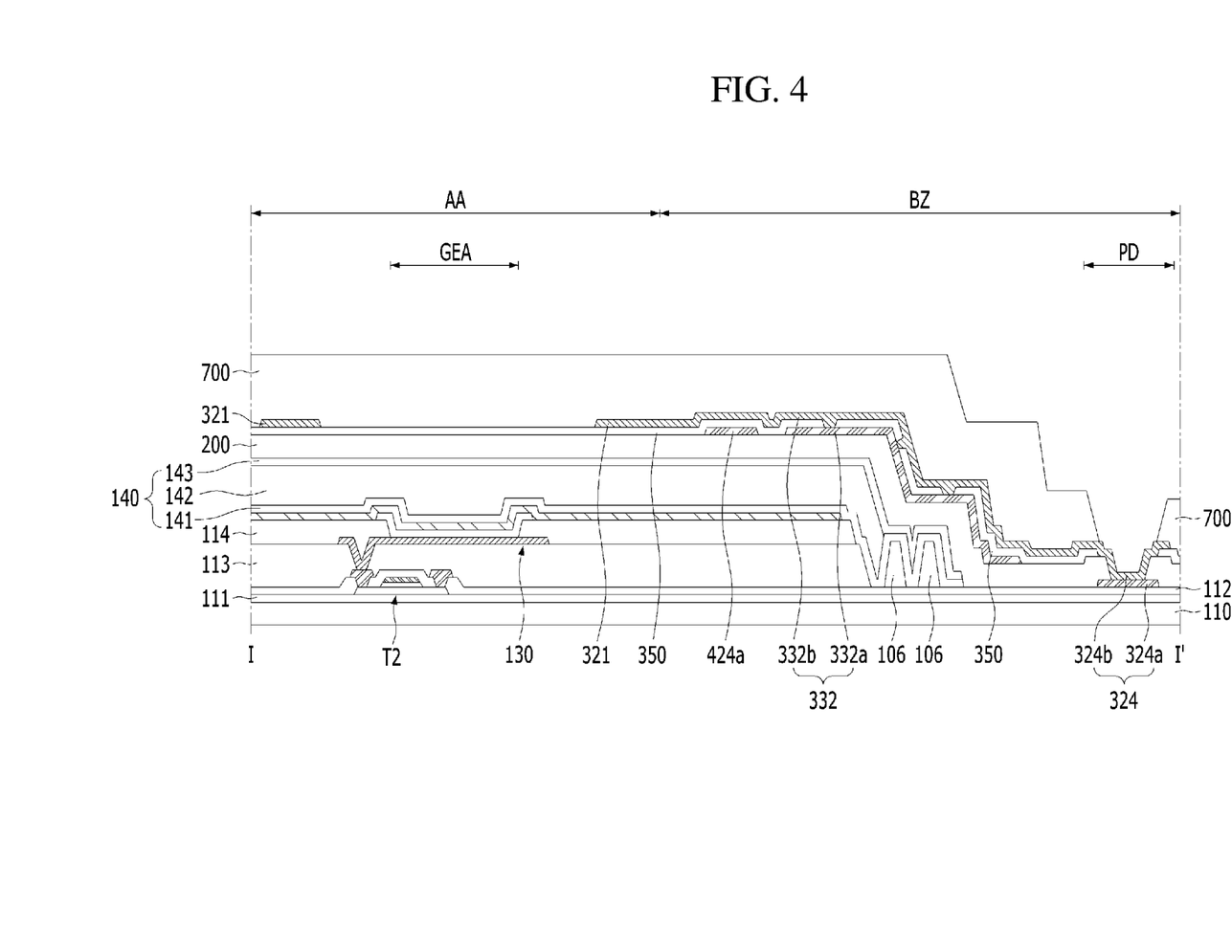
FIG. 4 is a view taken along I-I' of FIG. 2 according to an embodiment of the present disclosure.
Figure 5:
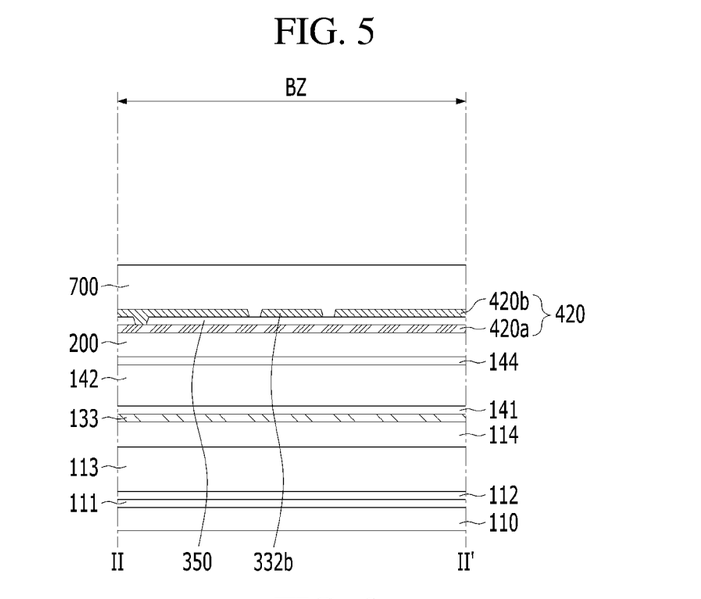
FIG. 5 is a view taken along II-II' of FIG. 2 according to an embodiment of the present disclosure.
Figure 6:
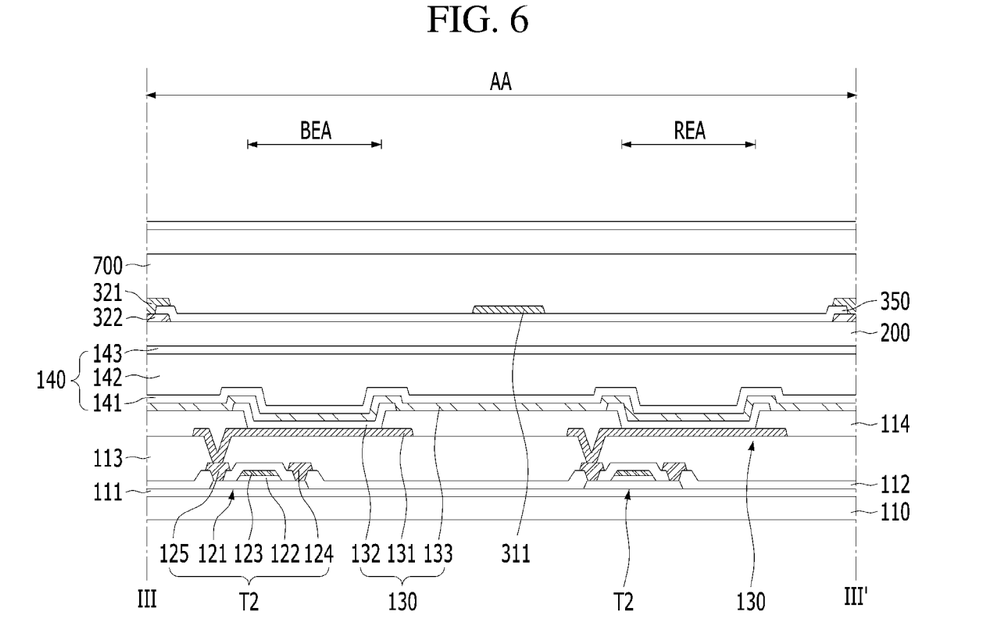
FIG. 6 is a view taken along III-III' of FIG. 3 according to an embodiment of the present disclosure.

FIGS. 1 and 2 are views schematically showing a touch display apparatus according to an embodiment of the present disclosure. FIG. 3 is an enlarged view of K region in FIG. 2 according to an embodiment of the present disclosure. FIG. 4 is a view taken along I-I' of FIG. 2 according to an embodiment of the present disclosure. FIG. 5 is a view taken along II-II' of FIG. 2 according to an embodiment of the present disclosure. FIG. 6 is a view taken along III-III' of FIG. 3 according to an embodiment of the present disclosure.

Referring to FIGS. 1 to 6, the touch display apparatus according to the embodiment of the present disclosure may include a device substrate 110. The device substrate 110 may include an insulating material. For example, the device substrate 110 may include glass or plastic. The device substrate 110 may include a display area AA and a bezel area BZ disposed outside the display area AA. For example, the bezel area BZ may surround the display area AA.

The display area AA of the device substrate 110 may display an image provided to user. For example, a plurality of pixel areas PA may be disposed in the display area AA of the device substrate 110. The pixel areas PA may be disposed side by side in a first direction and a second direction that is perpendicular to the first direction. Two pixel areas PA adjacent in the first direction may be alternately disposed. Two pixel areas PA adjacent in the second direction may be alternately disposed. Each of the pixel areas PA may realize a color different from adjacent pixel areas PA. The touch display apparatus according to the embodiment of the present disclosure may have a pen-tile structure. For example, in the display area AA, the pixel areas PA may include first rows in which red pixel regions R and blue pixel regions B are alternately arranged and second rows in which green pixel regions G are arranged, wherein the first rows and the second rows are alternately disposed.

Light displaying a specific color may be emitted from each pixel area PA. For example, a pixel driving circuit and a light-emitting device 130 being electrically connected to the pixel driving circuit may be disposed in each pixel area PA.

The pixel driving circuit may be connected to one gate line of gate lines GL applying a gate signal and one data line of data lines DL applying a data signal. For example, the pixel driving circuit may generate a driving current corresponding to the data signal according to the gate signal. The driving current generated by the pixel driving circuit may be provided to the light-emitting device 130 for one frame. For example, the pixel driving circuit may include a switching thin film transistor T1, a driving thin film transistor T2, and a storage capacitor Cst.

The switching thin film transistor T1 may transmit the data signal to the driving thin film transistor T2 according to the gate signal. The driving thin film transistor T2 may generate the driving current. For example, the driving thin film transistor T2 may include a semiconductor pattern 121, a gate insulating layer 122, a gate electrode 123, a source electrode 124 and a drain electrode 125.

The semiconductor pattern 121 may include a semiconductor material. For example, the semiconductor pattern 121 may include at least one of amorphous silicon, polycrystalline silicon and oxide semiconductor. The semiconductor pattern 121 may include a source region, a drain region and a channel region. The channel region may be disposed between the source region and the drain region. The source region and the drain region may have a resistance lower than the channel region. For example, the source region and the drain region may include a conductorized region of oxide semiconductor.

The gate insulating layer 122 may be disposed on the semiconductor pattern 121. For example, the gate insulating layer 122 may overlap the channel region of the semiconductor pattern 121. The source region and the drain region of the semiconductor pattern 121 may be disposed outside the gate insulating layer 122. The gate insulating layer 122 may include an insulating material. For example, the gate insulating layer 122 may include an inorganic insulating material, such as silicon oxide (SiOx) and silicon nitride (SiNx).

The gate electrode 123 may be disposed on the gate insulating layer 122. For example, the gate electrode 123 may overlap the channel region of the semiconductor pattern 121. The gate electrode 123 may be insulated from the semiconductor pattern 121 by the gate insulating layer 122. For example, a side surface of the gate insulating layer 122 may be continuous with a side surface of the gate electrode 123. The gate electrode 123 may include a conductive material. For example, the gate electrode 123 may include a metal, such as aluminum (Al), titanium (Ti), copper (Cu), molybdenum (Mo), tantalum (Ta), chrome (Cr) and tungsten (W). The channel region of the semiconductor pattern 121 may have an electric conductivity corresponding to a voltage applied to the gate electrode 123.

The source electrode 124 may include a conductive material. For example, the source electrode 124 may include a metal, such as aluminum (Al), titanium (Ti), copper (Cu), molybdenum (Mo), tantalum (Ta), chrome (Cr) and tungsten (W). The source electrode 124 may be insulated from the gate electrode 123. The source electrode 124 may be disposed on a layer different from the gate electrode 123. For example, an interlayer insulating layer 112 covering the gate electrode 123 may be disposed on the device substrate 110, and the source electrode 124 may be disposed on the interlayer insulating layer 112. The interlayer insulating layer 112 may include an insulating material. For example, the interlayer insulating layer 112 may include an inorganic insulating material, such as silicon oxide (SiOx) and silicon nitride (SiNx).

The source electrode 124 may be electrically connected to the source region of the semiconductor pattern 121. For example, the interlayer insulating layer 112 may include a source contact hole partially exposing the source region of the semiconductor pattern 121. The source electrode 124 may be in direct contact with the source region of the semiconductor pattern 121 through the source contact hole.

The drain electrode 125 may include a conductive material. For example, the drain electrode 125 may include a metal, such as aluminum (Al), titanium (Ti), copper (Cu), molybdenum (Mo), tantalum (Ta), chrome (Cr) and tungsten (W). The drain electrode 125 may be insulated from the gate electrode 123. The drain electrode 125 may be disposed on a layer different from the gate electrode 123. For example, the drain electrode 125 may be disposed on the interlayer insulating layer 112. The drain electrode 125 may be disposed on the same layer as the source electrode 124. The drain electrode 125 may include the same material as the source electrode 124. For example, the drain electrode 125 may be formed simultaneously with the source electrode 124.

The drain electrode 125 may be electrically connected to the drain region of the semiconductor pattern 121. For example, the interlayer insulating layer 112 may include a drain contact hole partially exposing the drain region of the semiconductor pattern 121. The drain electrode 125 may be in direct contact with the drain region of the semiconductor pattern 121 through the drain contact hole.

The switching thin film transistor T1 may have the same structure as the driving thin film transistor T2. For example, the switching thin film transistor T1 may include a gate electrode electrically connected to the corresponding gate line GL, a source electrode electrically connected to the corresponding data line DL, and a drain electrode electrically connected to the gate electrode 123 of the driving thin film transistor T2. The source electrode 124 of the driving thin film transistor T2 may be electrically connected to a first power voltage supply line VDD supplying a positive power voltage. The storage capacitor Cst may maintain a signal applied to the gate electrode 123 of the driving thin film transistor T2 for one frame. For example, the storage capacitor Cst may be connected between the gate electrode 123 and the drain electrode 125 of the driving thin film transistor T2.

The light-emitting device 130 may emit light using the driving current supplied from the pixel driving circuit. For example, the light-emitting device 130 may include a first emission electrode 131, a light-emitting stack 132, and a second emission electrode 133, which are sequentially stacked on the device substrate 110.

The first emission electrode 131 may be electrically connected to the drain electrode 125 of the driving thin film transistor T2. For example, the driving current generated by the pixel driving circuit may be supplied to the first emission electrode 131 of the light-emitting device 130. The first emission electrode 131 may include a conductive material. The first emission electrode 131 may include a material having a high reflectance. For example, the first emission electrode 131 may be a metal, such as aluminum (Al), titanium (Ti), copper (Cu), molybdenum (Mo), tantalum (Ta), chrome (Cr) and tungsten (W). The first emission electrode 131 may have a multi-layer structure. For example, the first emission electrode 131 may have a structure in which a reflective electrode made of a metal is disposed between transparent electrodes made of a transparent conductive material, such as ITO and IZO.

The light-emitting stack 132 may generate light having luminance corresponding to a voltage difference between the first emission electrode 131 and the second emission electrode 133. For example, the light-emitting stack 132 may include an emission material layer (EML) having an emission material. The emission material may include an organic material, an inorganic material or a hybrid material. For example, the touch display apparatus according to the embodiment of the present disclosure may be an organic light-emitting display apparatus including an organic emission material.

The light-emitting stack 132 may have a multi-layer structure. For example, the light-emitting stack 132 may further include at least one of a hole injection layer (HIL), a hole transport layer (HTL), an electron transport layer (ETL) and an electron injection layer (EIL). The light-emitting stack 132 may include a plurality of the emission material layer. For example, the light-emitting stack 132 may include a charge generation layer (CGL) between a first emission material layer and a second emission material layer. The second emission material layer may include a material different from the first emission material layer.

The second emission electrode 133 may include a conductive material. The second emission electrode 133 may have a transmittance higher than the first emission electrode 131. For example, the second emission electrode 133 may be a transparent electrode made of a transparent conductive material. The second emission electrode 133 may include a transparent conductive oxide material, such as ITO, IZO and AZO. Thus, in the touch display apparatus according to the embodiment of the present disclosure, the light generated by the light-emitting stack 132 of each pixel area PA may be emitted outside through the second emission electrode 133 of the corresponding pixel area PA.

A device buffer layer 111 may be disposed between the device substrate 110 and the pixel driving circuit of each pixel area PA. The device buffer layer 111 may prevent pollution due to the device substrate 110 in a process of forming the pixel driving circuits. The device buffer layer 111 may extend on the bezel area BZ of the device substrate 110. For example, an upper surface of the device substrate 110 toward the pixel driving circuit of each pixel area PA may be completely covered by the device buffer layer 111. The device buffer layer 111 may include an insulating material. For example, the device buffer layer 111 may include an inorganic insulating material, such as silicon oxide (SiOx) and silicon nitride (SiNx). The device buffer layer 111 may include a multi-layer structure. For example, the device buffer layer 111 may have a stacked structure of an inorganic insulating layer made of silicon oxide (SiOx) and an inorganic insulating layer made of silicon nitride (SiNx).

A planarization layer 113 may be disposed between the pixel driving circuit and the light-emitting device 130 of each pixel area PA. The planarization layer 113 may remove a thickness difference due to the pixel driving circuit of each pixel area PA. For example, an upper surface of the planarization layer 113 opposite to the device substrate 110 may be a flat surface. The switching thin film transistor T1, the driving thin film transistor T2 and the storage capacitor Cst in each pixel area PA may be covered by the planarization layer 113. The planarization layer 113 may include an insulating material. The planarization layer 113 may include a material different from the interlayer insulating layer 112. For example, the planarization layer 113 may include an organic insulating material.

The first emission electrode 131 of each pixel area PA may penetrate the planarization layer 113 to be electrically connected to the pixel driving circuit of the corresponding pixel area PA. For example, the planarization layer 113 may include pixel contact holes partially exposing the drain electrode 125 of the driving thin film transistor T2 in each pixel area PA. The first emission electrode 131 of each pixel area PA may be in direct contact with the drain electrode 125 of the driving thin film transistor T2 in the corresponding pixel area PA through one of the pixel contact holes.

The first emission electrode 131 of each pixel area PA may be insulated from the first emission electrode 131 of adjacent pixel area PA. The first emission electrode 131 of each pixel area PA may be spaced away from the first emission electrode 131 of adjacent pixel area PA. For example, a bank insulating layer 114 may be disposed between the first emission electrodes 131 of adjacent pixel areas PA. The bank insulating layer 114 may include an insulating material. For example, the bank insulating layer 114 may include an organic insulating material. The bank insulating layer 114 may cover an edge of the first emission electrode 131 in each pixel area PA. The light-emitting stack 132 and the second emission electrode 133 of each pixel area PA may be stacked on a portion of the corresponding first emission electrode 131 exposed by the bank insulating layer 114. For example, the bank insulating layer 114 may define an emission area BEA, GEA and REA in each pixel area PA. A plurality of emission areas BEA, GEA and REA defined by the bank insulating layer 114 may include a blue emission area BEA, a green emission area GEA, and a red emission area REA.

The light-emitting device 130 of each pixel area PA may have the same structure as the light-emitting device 130 of adjacent pixel area PA. For example, the light-emitting stack 132 of each pixel area PA may extend along a surface of the bank insulating layer 114 to be connected to the light-emitting stack 132 of adjacent pixel area PA. The light emitted from the light-emitting device 130 of each pixel area PA may display the same color as the light emitted from the light-emitting device 130 of adjacent pixel area PA. For example, the light-emitting stack 132 of each pixel area PA may emit white light. The light-emitting stack 132 of each pixel area PA may be formed simultaneously with the light-emitting stack 132 of adjacent pixel area PA. Thus, in the touch display apparatus according to the embodiment of the present disclosure, a process of forming the light-emitting stack 132 on each pixel area PA may be simplified.

A voltage applied to the second emission electrode 133 of each pixel area PA may be the same as a voltage applied to the second emission electrode 133 of adjacent pixel area PA. For example, the second emission electrode 133 of each pixel area PA may be electrically connected to a second power voltage supply line VSS supplying a negative power voltage. Thus, in the touch display apparatus according to the embodiment of the present disclosure, the luminance of the light emitted from the light-emitting device 130 of each pixel area PA may be adjusted by the data signal applied to the corresponding pixel area PA. The second emission electrode 133 of each pixel area PA may be electrically connected to the second emission electrode 133 of adjacent pixel area PA. For example, the second emission electrode 133 of each pixel area PA may be in direct contact with the second emission electrode 133 of adjacent pixel area PA. The second emission electrode 133 of each pixel area PA may be formed simultaneously with the second emission electrode 133 of adjacent pixel area PA. Therefore, in the touch display apparatus according to the embodiment of the present disclosure, a process of forming the second emission electrode 133 on each pixel area PA may be simplified.

An encapsulating unit 140 (e.g., an encapsulation layer) may be disposed on the light-emitting device 130 of each pixel area PA. The encapsulating unit 140 may prevent or at least reduce the damage of the light-emitting devices 130 due to external moisture and/or oxygen. The light-emitting device of each pixel area PA may be completely covered by the encapsulating unit 140. For example, the encapsulating unit 140 may extend on the bezel area BZ of the device substrate 110.

The encapsulating unit 140 may include a plurality of encapsulation layers including at least one inorganic encapsulating layer 141 and 143, and at least one organic encapsulating layer 142. For example, the encapsulating unit 140 may have a structure in which at least one organic encapsulating layer 142 is disposed between inorganic encapsulating layers 141 and 143. The uppermost layer of the encapsulating unit 140 may be the inorganic encapsulating layer 141 and 143. For example, an upper surface and a side surface of the organic encapsulating layer 142 may be covered by the inorganic encapsulating layer 141 and 143. Thus, in the touch display apparatus according to the embodiment of the present disclosure, the penetration of the external moisture and oxygen may be effectively blocked or at least reduced.

The inorganic encapsulating layers 141 and 143 may include an inorganic insulating material. For example, the inorganic encapsulating layers 141 and 143 may include an inorganic insulating material capable of low-temperature deposition, such as silicon nitride (SiNx), silicon oxide (SiOx), silicon oxynitride (SiON) and aluminum oxide ($Al_2O_3$). Thus, in the touch display apparatus according to the embodiment of the present disclosure, the damage of the light-emitting stacks 132 due to a process of forming the inorganic encapsulating layer 141 and 143 may be prevented.

The organic encapsulating layer 142 may relieve the stress due to the inorganic encapsulating layers 141 and 143. For example, the organic encapsulating layer 142 may include an organic insulating material, such as acrylic resin, epoxy resin, polyimide, polyethylene and silicon oxycarbide (SiOC). A thickness difference due to the light-emitting devices 130 may be removed by the organic encapsulating layer 142. For example, an upper surface of the organic encapsulating layer 142 opposite to the device substrate 110 may be a flat surface.

The organic encapsulating layer 142 may be formed by inkjet process. For example, a dam 106 may be disposed on the bezel area BZ of the device substrate 110. The dam 106 may block the flow of the organic encapsulating layer 142. The dam 106 may extend along an edge of the display area AA. For example, in the touch display apparatus according to the embodiment of the present disclosure, the organic encapsulating layer 142 may be formed in a region defined by the dam 106. The dam 106 may be formed using a process of forming at least one of insulating layers, which are disposed between the device substrate 110 and the encapsulating unit 140. For example, the dam 106 may be formed simultaneously with the planarization layer 113. The dam 106 may include the same material as the planarization layer 113. For example, the dam 106 may include an organic insulating material. The interlayer insulating layer 112 may extend on the bezel area BZ of the device substrate 110. For example, the dam 106 may be disposed on the interlayer insulating layer 112. A thickness of the dam 106 may be the same as a thickness of the planarization layer 113.

A touch sensor Cm may be disposed on the encapsulating unit 140. The touch sensor Cm may sense a touch of user and/or a tool. For example, the touch sensor Cm may sense the presence or absence of a touch and a touch position by a change of the mutual capacitance. The touch sensor Cm may include a plurality of touch lines 310 and 320. For example, the touch sensor Cm may include driving touch lines 310 (e.g., a first touch electrode line) to which a touch driving signal is applied, and touch lines 320 (e.g., a second touch electrode line) to which a touch sensing signal is applied.

Each of the driving touch lines 310 may include first touch electrodes 311 and first bridge electrodes 312. The first touch electrodes 311 may be disposed side by side on the encapsulating unit 140. The first bridge electrodes 312 may electrically connect between the first touch electrodes 311. Each of the first bridge electrodes 312 may extend in a first direction. For example, each of the driving touch lines 310 may include the first touch electrodes 311 connected in the first direction by the first bridge electrodes 312.

The first touch electrodes 311 may include a conductive material. The first touch electrodes 311 may include a material having a relatively low resistance. For example, the first touch electrodes 311 may include a metal, such as aluminum (Al), titanium (Ti), copper (Cu), molybdenum (Mo) and tantalum (Ta). Each of the first touch electrodes 311 may have a multi-layer structure. For example, the first touch electrodes 311 may have a three-layer structure, such as Ti/Al/Ti, MoTi/Cu/MoTi and Ti/Al/Mo. However, the present invention is not limited thereto. For example, the first touch electrodes 311 may have a double layer structure.

The first bridge electrodes 312 may include a conductive material. The first bridge electrodes 312 may include a material having a relatively low resistance. For example, the first bridge electrodes 312 may include a metal, such as aluminum (Al), titanium (Ti), copper (Cu), molybdenum (Mo) and tantalum (Ta). The first bridge electrodes 312 may include the same material as the first touch electrodes 311. Each of the first bridge electrodes 312 may have a multi-layer structure. For example, the first bridge electrodes 312 may have a three-layer structure, such as Ti/Al/Ti, MoTi/Cu/MoTi and Ti/Al/Mo. However, the present invention is not limited thereto. For example, the first bridge electrodes 312 may have a double layer structure. The first bridge electrodes 312 may have the same structure as the first touch electrodes 311. The first bridge electrodes 312 may be disposed on the same layer as the first touch electrodes 311. For example, each of the first bridge electrodes 312 may be in direct contact with the corresponding first touch electrodes 311.

Each of the sensing touch lines 320 may include second touch electrodes 321 and second bridge electrodes 322. The second touch electrodes 321 may be disposed side by side on the encapsulating unit 140. The second touch electrodes 321 may be disposed on the same layer as the first touch electrodes 311. The second touch electrodes 321 may be insulated from the first touch electrodes 311. For example, the second touch electrodes 321 may be disposed between the first touch electrodes 311. The second touch electrodes 321 may have the same shape as the first touch electrodes 311. For example, the first touch electrodes 311 and the second touch electrodes 321 may be alternately arranged on the encapsulating unit 140. Thus, the touch display apparatus according to the embodiment of the present disclosure may sense the touch of the user and/or the tool using the driving touch lines 310 and the sensing touch lines 320 of the touch sensor Cm.

The second touch electrodes 321 may include a conductive material. The second touch electrodes 321 may include a material having a relatively low resistance. For example, the second touch electrodes 321 may include a metal, such as aluminum (Al), titanium (Ti), copper (Cu), molybdenum (Mo) and tantalum (Ta). The second touch electrodes 321 may include the same material as the first touch electrodes 311. Each of the second touch electrodes 321 may have a multi-layer structure. For example, the second touch electrodes 321 may have a three-layer structure, such as Ti/Al/Ti, MoTi/Cu/MoTi and Ti/Al/Mo. However, the present invention is not limited thereto. For example, the second touch electrodes 321 may have a double layer structure. The second touch electrodes 321 may have the same structure as the first touch electrodes 311. The second touch electrodes 321 may be disposed on the same layer as the first touch electrodes 311 and the first bridge electrodes 312. The second touch electrodes 321 may be insulated from the first bridge electrodes 312. The second touch electrodes 321 may be spaced away from the first bridge electrodes 312. For example, the first bridge electrodes 312 may cross between the second touch electrodes 321.

The second bridge electrodes 322 may electrically connect between the second touch electrodes 321. Each of the second bridge electrodes 322 may extend in a second direction. For example, each of the sensing touch lines 320 may include the second touch electrodes 321 connected in the second direction by the second bridge electrodes 322. The second direction may be different from the first direction. For example, the second direction may be perpendicular to the first direction. The second bridge electrodes 322 may cross between the first touch electrodes 311. For example, each of the second bridge electrodes 322 may intersect one of the first bridge electrodes 312. The second bridge electrodes 322 may be insulated from the first bridge electrodes 312. The second bridge electrodes 322 may be disposed on a layer different from the first bridge electrodes 312. For example, the touch sensor Cm may include a touch insulating layer 350 on the second bridge electrodes 322, and the first touch electrodes 311, the first bridge electrodes 312 and the second touch electrodes 321 may be disposed on the touch insulating layer 350.

The touch insulating layer 350 may include an insulating material. For example, the touch insulating layer 350 may include an inorganic insulating material, such as silicon oxide (SiOx) and silicon nitride (SiNx). However, the present invention is not limited thereto. For example, the touch insulating layer 350 may include an organic insulating material, or have a stacked structure of an inorganic insulating material layer and an organic insulating material layer. The touch insulating layer 350 may include touch contact holes partially exposing each second bridge electrode 322. Each of the second touch electrodes 321 may be connected to the corresponding second bridge electrode 322 through one of the touch contact holes.

The second bridge electrodes 322 may include a conductive material. The second bridge electrodes 322 may include a material having a relatively low resistance. For example, the second bridge electrodes 322 may include a metal, such as aluminum (Al), titanium (Ti), copper (Cu), molybdenum (Mo) and tantalum (Ta). Each of the second bridge electrodes 322 may have a multi-layer structure. For example, the second bridge electrodes 322 may have a three-layer structure, such as Ti/Al/Ti, MoTi/Cu/MoTi and Ti/Al/Mo. However, the present invention is not limited thereto. For example, the second bridge electrodes 322 may have a double layer structure.

The first touch electrodes 311, the first bridge electrodes 312, the second touch electrodes 321 and the second bridge electrodes 322 of the touch sensor Cm may be disposed in the display area AA. The emission areas BEA, GEA and REA of each pixel area PA may be disposed between the first touch electrodes 311, the first bridge electrodes 312, the second touch electrodes 321 and the second bridge electrodes 322. The driving touch lines 310 and the sensing touch lines 320 may be disposed outside the light-emitting devices 130. For example, the first touch electrodes 311, the first bridge electrodes 312, the second touch electrodes 321, and the second bridge electrodes 322 may overlap the bank insulating layer 114. In a plan view, each of the first touch electrodes 311 and each of the second touch electrodes 321 may have a mesh shape including openings overlapping with the emission areas BEA, GEA, and REA of each pixel area PA. Thus, in the touch display apparatus according to the embodiment of the present disclosure, the accuracy of the touch sensing using the touch sensor Cm may be improved, and the decrease in light extraction efficiency due to the touch sensor Cm may be reduced.

A touch buffer layer 200 may be disposed between the encapsulating unit 140 and the touch sensor Cm. For example, the second bridge electrodes 322 may be disposed between the touch buffer layer 200 and the touch insulating layer 350. The touch buffer layer 200 may reduce a parasitic capacitance generated between the second emission electrode 133 of each light-emitting device 130 and the touch sensor Cm. For example, a distance between each driving touch line 310 of the touch sensor Cm and the second emission electrode 133 of each light-emitting device 130 and a distance between each sensing touch line 320 of the touch sensor Cm and the second emission electrode 133 of each light-emitting device 130 may be increased by the touch buffer layer 200. Thus, in the touch display apparatus according to the embodiment of the present disclosure, the accuracy of the touch sensing by the touch sensor Cm may be improved. The touch buffer layer 200 may include an insulating material. For example, the touch buffer layer 200 may include an inorganic insulating material, such as silicon oxide (SiOx) and silicon nitride (SiNx).

A device passivation layer 700 may be disposed on the touch sensor Cm. The device passivation layer 700 may prevent or at least reduce the damage of the touch sensor Cm due to the external impact. For example, the driving touch lines 310 and the sensing touch lines 320 may be covered by the device passivation layer 700. The device passivation layer 700 may be in direct contact with the touch insulating layer 350 at the outside of the first touch electrodes 311, the first bridge electrodes 312, and the second touch electrodes 321. The device passivation layer 700 may include an insulating material. The device passivation layer 700 may include a material different from the touch insulating layer 350. For example, the device passivation layer 700 may include an organic insulating material.

Various signals to realize an image may be applied to each pixel area PA through the bezel area BZ of the device substrate 110. For example, the bezel area BZ of the device substrate 110 may include a pad area PD in which display pads 104 and touch pads 314 and 324 are disposed. The dam 106 may be disposed between the display area AA and the pad area PD. For example, the display pads 104 and the touch pads 314 and 324 may be spaced away from the encapsulating unit 140. Thus, in the touch display apparatus according to the embodiment of the present disclosure, it is possible to prevent or at least reduce some of the display pads 104 and/or the touch pads 314 and 324 from being unintentionally covered by the organic encapsulation layer 142. Therefore, in the touch display apparatus according to the embodiment of the present disclosure, the distortion of the signal transmitted through the display pads 104 and/or the touch pads 314 and 324 may be prevented or at least reduced.

The gate lines GL and/or the data lines DL may be electrically connected to the display pads 104. For example, the data signal applied to each pixel area PA may be transmitted through one of the display pads 104 and one of the data lines DL. The touch pads 314 and 324 may be disposed side by side with the display pads 104. For example, the pad area PD may be disposed on a side of the display area AA.

Each of the touch pads 314 and 324 may include a lower pad electrode 324a and an upper pad electrode 324b on the lower pad electrode 324a. The touch pads 314 and 324 may be formed using a process of forming the pixel driving circuits, the light-emitting devices 130, and the touch sensor Cm. For example, the lower pad electrode 324a may include the same material as the source electrode 124 and the drain electrode 125 of each pixel driving circuit, the upper pad electrode 324b may include the same material as the first touch electrodes 311, the first bridge electrodes 312, and the second touch electrodes 321. The display pads 104 may have the same structure as the touch pads 314 and 324. For example, each of the display pads 104 may include a lower pad electrode and an upper pad electrode on the lower pad electrode. The lower pad electrode of each display pad 104 may include the same material as the lower pad electrode 324a of each touch pad 304, and the upper pad electrode of each display pad 104 may include the same material as the upper pad electrode 324b of each touch pad 314 and 324. For example, the display pads 104 may be formed simultaneously with the touch pads 314 and 324.

The driving touch lines 310 and the sensing touch lines 320 may be electrically connected to the touch pads 314 and 324 by touch routing lines 331 and 332. For example, the touch routing lines 331 and 332 may include driving routing lines 331 electrically connecting each driving touch line 310 to one of the touch pads 314 and 324, and sensing routing lines 332 electrically connecting each sensing touch line 320 to one of the touch pads 314 and 324. The driving routing lines 331 and the sensing routing lines 332 may extend along an edge of the display area AA. The sensing routing lines 332 may be insulated from the driving routing lines 331. For example, each of the driving routing lines 331 may be connected to one of the driving touch lines 310 on two opposite sides of the display area AA, each of the sensing routing lines 332 may be connected to one of the sensing touch lines 320 on one of the other two sides of the display area AA, and a portion of the driving routing lines 331 may extend along a side of the display area AA in which the sensing routing lines 332 are not arranged.

The driving routing lines 331 and the sensing routing lines 332 may be formed using a process of forming the touch sensor Cm. For example, each of the sensing routing lines 332 may have a stacked structure of a lower routing line 332a including the same material as the second bridge electrodes 322, and an upper routing line 332b including the same material as the first touch electrodes 311. The upper routing line 332b of each sensing routing line 332 may be electrically connected to the lower routing line 332a of the corresponding sensing routing line 332. For example, the touch insulating layer 350 may include routing contact holes partially exposing the lower routing line 332a of each sensing routing line 332. The upper routing line 332b of each sensing routing line 332 may be in direct contact with the lower routing line 332a of the corresponding sensing routing line 332 through the routing contact holes. The driving routing lines 331 may have the same structure as the sensing routing lines 332. For example, each of the driving routing lines 331 may include a lower routing line and an upper routing line penetrating the touch insulating layer to connect to the lower routing line. Thus, in the touch display apparatus according to the embodiment of the present disclosure, the driving touch lines 310 and the sensing touch lines 320 may be stably connected to the corresponding touch pad 314 and 324 by one of the touch routing lines 331 and 332. And, in the touch display apparatus according to the embodiment of the present disclosure, a resistance of each touch routing line 331 and 332 may be reduced. Therefore, in the touch display apparatus according to the embodiment of the present disclosure, a signal delay due to the resistance of the touch routing lines 331 and 332 may be reduced.

An inner guard line 410 and 420 may be disposed between the display area AA and the touch routing lines 331 and 332. For example, a first driving guard line 410 may be disposed between the display area AA and the driving routing lines 331, and a first sensing guard line 420 may be disposed between the display area AA and the sensing routing lines 332. As shown in FIG. 2, the first driving guard line 410 surrounds a plurality of sides of the display area except for the side of the display area AA where the first sensing guard line 420 is disposed. For example, the first driving guard line 410 surrounds a right side, a top side, and a bottom side of the display area AA except for the right side of the display area AA from a plan view of the touch display device. In contrast, the first sensing guard line 420 is disposed adjacent to the left side of the display area AA but is not around the right side, top side, and bottom side of the display area AA from the plan view of the touch display device.

A signal applied to each of the first driving guard line 410 and the first sensing guard line 420 may be different from a signal applied to adjacent touch routing lines 331 and 332. For example, a signal that substantially matches the touch sensing signal may be applied to the first driving guard line 410 by a first guard pad 414 disposed side by side with the display pads 104 and the touch pads 314 and 324, and a signal that substantially matches the touch driving signal may be applied to the first sensing guard line 420 by a second guard pad 424 disposed side by side with the display pads 104 and the touch pads 314 and 324. Thus, in the touch display apparatus according to the embodiment of the present disclosure, the second touch electrodes 321 disposed close to the driving routing lines 331 may be not affected by the touch driving signal applied to the driving routing lines 331. And, in the touch display apparatus according to the embodiment of the present disclosure, the first touch electrodes 311 disposed close to the sensing routing lines 332 may be not affected by the touch sensing signal applied to the sensing routing lines 332. Therefore, in the touch display apparatus according to the embodiment of the present disclosure, the accuracy of the touch sensing may be improved by the first driving guard line 410 and the first sensing guard line 420.

The first driving guard line 410 and the first sensing guard line 420 may be formed using a process of forming the touch sensor Cm. The first driving guard line 410 and the first sensing guard line 420 may have the same structure as the touch routing lines 331 and 332. That is, each of the first driving guard line 410 and the first sensing guard line 420 is multi-layered. For example, the first sensing guard line 420 may have a structure of a first conductive layer 420a including the same material as the second bridge electrodes 322, and a second conductive layer 420b including the same material as the first bridge electrodes 312. The second conductive layer 420b may be electrically connected to the first conductive layer 420a. For example, the touch insulating layer 350 may include guard contact holes partially exposing the first conductive layer 420a. The second conductive layer 420b may be in direct contact with the first conductive layer 420a through the guard contact holes. Thus, in the touch display apparatus according to the embodiment of the present disclosure, an effect of the touch sensing signal applied through the lower routing line 332a and the upper routing line 332b of each sensing routing line 332 may be blocked by the first conductive layer 420a and the second conductive layer 420b of the first sensing guard line 420. The first driving guard line 410 may have the same structure as the first sensing guard line 420. For example, the first driving guard line 410 may have a stacked structure of a first conductive layer and a second conductive layer. Therefore, in the touch display apparatus, a decrease of the touch sensitivity due to the touch routing lines 331 and 332 may be effectively prevented.

The first driving guard line 410 may intersect the driving routing lines 331. The first sensing guard line 420 may intersect the sensing routing lines 332. For example, the second conductive layer 420b of the first driving guard line 410 and the first sensing guard line 420 may be partially separated, and the lower routing line 332a of each driving routing line 331 and each sensing routing line 332 may be partially separated. A region where the second conductive layer 420b is cut off may overlap a region where the lower routing line 332a is cut off. The first driving guard line 410 and the first sensing guard line 420 may intersect the driving routing lines 331 or the sensing routing lines 332 in a region where the second conductive layer 420b is cut off, and the driving routing lines 331 and the sensing routing lines 332 may intersect the first driving guard line 410 or the first sensing guard line 420 in a region where the lower routing line 332a is cut off.

Accordingly, the touch display apparatus according to the embodiment of the present disclosure may include the inner guard line 410 and 420 disposed between the display area AA and the touch routing lines 331 and 332, wherein a signal applied to each inner guard line 410 and 420 may be different from a signal applied by adjacent touch routing line 331 and 332. Thus, in the touch display apparatus according to the embodiment of the present disclosure, a malfunction of the touch electrodes 311 and 321 disposed close to the touch routing lines 331 and 332 due to a signal applied to the touch routing lines 331 and 332 may be prevented or at least reduced. Therefore, the touch display apparatus according to the embodiment of the present disclosure may accurately sense the touch of the user and/or the tool.

The touch display apparatus according to the embodiment of the present disclosure is described that the driving routing lines 331 electrically connected to the driving touch lines 310 at a side of the display area AA may be connected to a touch pad different from the driving routing lines 331 electrically connected to the driving touch lines 310 at another side of the display area AA. However, in the touch display apparatus according to another embodiment of the present disclosure, the driving routing lines 331 electrically connected to the same driving touch line 310 may be connected to a single touch pad 314.

In the touch display apparatus according to the embodiment of the present disclosure, a power voltage supply line 500 electrically connected to power pads 504 may be disposed outside the touch routing lines 331 and 332. The power voltage supply line 500 may extend along an edge of the display area AA. In one embodiment, the power voltage supply line 500g may include a first portion at one side of the display area (e.g., the right side) and a second portion at another side of the display area (e.g., the left side). An outer guard line 610 and 620 may be disposed between the touch routing lines 331 and 332 and the power voltage supply line 500. For example, a second driving guard line 610 may be disposed between the driving routing lines 331 and the power voltage supply line 500 (e.g., the first portion of the power voltage supply line 500), and a second sensing guard line 620 may be disposed between the sensing routing lines 332 and the power voltage supply line 500 (e.g., the second portion of the power voltage supply line 500). A signal applied to the second driving guard line 610 and the second sensing guard line 620 may be the same as a signal applied to adjacent touch routing line 331 and 332. For example, the touch driving signal may be applied to the second driving guard line 610 through a third guard pad 614 disposed side by side with the display pads 104 and the touch pads 314 and 324, and the touch sensing signal may be applied to the second sensing guard line 620 through a fourth guard pad 624 disposed side by side with the display pads 104 and the touch pads 314 and 324. Thus, in the touch display apparatus according to the embodiment of the present disclosure, the distortion of the signal applied to the driving routing line 331 or the sensing routing line 332 disposed close to the power voltage supply line 500 due to a signal applied by the power voltage supply line 500 may be prevented or at least reduced. Therefore, in the touch display apparatus according to the embodiment of the present disclosure, the accuracy of touch sensing may be improved by the second driving guard line 610 and the second sensing guard line 620.

Figure 7:
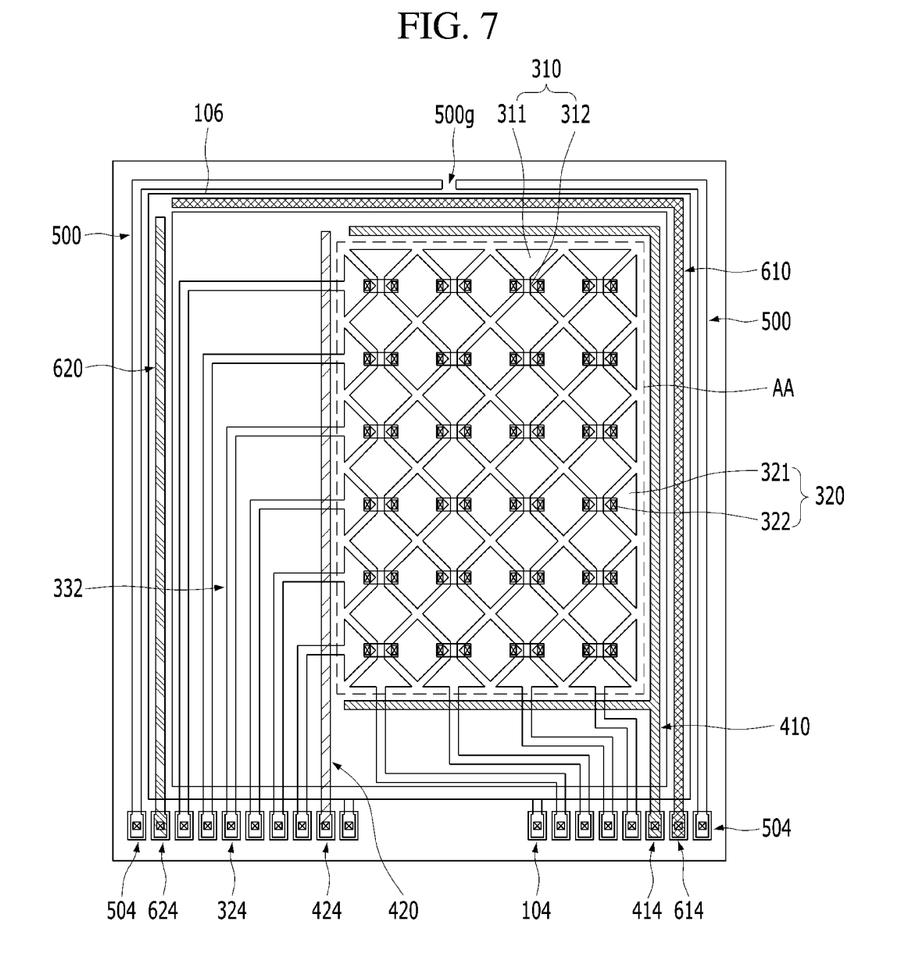
FIG. 7 is a view showing the touch display apparatus according to another embodiment of the present disclosure.

The power voltage supply line 500 may be partially separated. For example, the power voltage supply line 500 may include a separating groove 500g, as shown in FIGS. 2 and 7. Thus, in the touch display apparatus according to the embodiment of the present disclosure, a noise due to external signal may be blocked by the power voltage supply line 500, and an influence of the signal applied by the power voltage supply line 500 on a signal applied by a peripheral line, for example, the touch routing lines 331 and 332 may be reduced. Therefore, in the touch display apparatus according to the embodiment of the present disclosure, the accuracy for sensing touch of the user and/or the tool may be improved.

The touch display apparatus according to the embodiment of the present disclosure is described that the driving routing lines 331 may apply the touch driving signal through the opposite two sides of the display area AA, and the sensing routing line 332 may apply the touch sensing signal through one of the other two sides of the display area AA. However, in the touch display apparatus according to another embodiment of the present disclosure, each of the sensing routing lines 332 may be connected to one of the sensing touch lines 320 on the opposite two sides of the display area AA, and each of the driving routing lines 331 may be connected to one of the driving touch lines 310 on one of the other two sides of the display area AA. Alternately, in the touch display apparatus according to another embodiment of the present disclosure, each of the driving routing lines 331 may apply the touch driving signal through one of sides of the display area AA, and each of the sensing routing lines 332 may apply the touch sensing signal through one of the other three sides of the display area AA, as shown in FIG. 7. Thus, in the touch display apparatus according to another embodiment of the present disclosure, the degree of freedom for the arrangement of the driving routing lines 331 and the sensing routing lines 332 may be improved.

In the result, the touch display apparatus according to the embodiments of the present disclosure may comprise the driving guard line disposed between the display area and the driving routing lines and the sensing guard line disposed between the display area and the sensing routing liens, wherein a signal applied to the driving guard line may be the same as a signal applied to the sensing routing lines, and a signal applied to the sensing guard line may be the same as a signal applied to the driving routing lines. Thus, in the touch display apparatus according to the embodiments of the present disclosure, an influence of the touch driving signal applied by the driving routing lines and the touch sensing signal applied by the sensing routing lines on the touch electrodes may be blocked by the driving guard line and the sensing guard line. Thereby, in the touch display apparatus according to the embodiments of the present disclosure, the touch of the user and/or the tool may be accurately detected.

What is claimed is:

1. A touch display apparatus comprising:
a device substrate including a display area and a pad area;
a plurality of light-emitting devices on the display area of the device substrate;
an encapsulating layer on the device substrate, the encapsulating layer on the plurality of light-emitting devices;
a touch sensor on the encapsulating layer, the touch sensor including a plurality of driving touch lines extending in a first direction and a plurality of sensing touch lines extending in a second direction that is different from the first direction;
a plurality of driving routing lines each connecting a corresponding one of the plurality of driving touch lines to a corresponding touch pad from a plurality of touch pads that are on the pad area;
a plurality of sensing routing lines each connecting a corresponding one of the plurality of sensing touch lines to a corresponding touch pad from the plurality of touch pads;
a first driving guard line between the display area and the plurality of driving routing lines, the first driving guard line applied a signal that is a same as a signal applied to the plurality of sensing touch lines; and
a first sensing guard line between the display area and the plurality of sensing routing lines, the first sensing guard line applied a signal that is a same as a signal applied to the plurality of driving touch lines.

2. The touch display apparatus according to claim 1, wherein the first driving guard line intersects the plurality of driving routing lines, and the first sensing guard line intersects the plurality of sensing routing lines.

3. The touch display apparatus according to claim 1, further comprising:
a power voltage supply line;
a second driving guard line between the plurality of driving touch lines and a first portion of the power voltage supply line; and
a second sensing guard line between the plurality of sensing touch lines and a second portion of the power voltage supply line.

4. The touch display apparatus according to claim 3, wherein the second driving guard line is applied a signal that is a same as the signal applied to the driving touch lines, and the second sensing guard line is applied a signal that is a same as the signal applied to the plurality of sensing touch lines.

5. The touch display apparatus according to claim 1, wherein the first sensing guard line has a structure that is a same as a structure of the first driving guard line.

6. The touch display apparatus according to claim 5, wherein the plurality of driving routing lines and the plurality of sensing routing lines each have a structure that is a same as the structure of the first driving guard line and the structure of the first sensing guard line.

7. The touch display apparatus according to claim 5, wherein each of the first driving guard line and each of the first sensing guard line include a first conductive layer and a second conductive layer on the first conductive layer, and
wherein the second conductive layer of the first driving guard line is electrically connected to the first conductive layer of the first driving guard line, and the second conductive layer of the first sensing guard line is electrically connected to the first conductive layer of the first sensing guard line.

8. The touch display apparatus according to claim 7, wherein each of the plurality of driving touch lines and each of the plurality of sensing touch lines include a plurality of touch electrodes and a bridge electrode electrically connecting the plurality of touch electrodes, and
wherein the second conductive layer includes a same material as the plurality of touch electrodes.

9. A touch display apparatus comprising:
a substrate including a display area and a pad area;
a plurality of pads in the pad area, the plurality of pads including a first pad and a second pad;
a plurality of light-emitting devices on the display area;
a touch sensor on the display area, the touch sensor including a first touch electrode line in a first direction and a second touch electrode line in a second direction that is different from the first direction;
a first routing line connected to the first touch electrode line at a first side of display area, the first routing line transmitting a first signal between the first touch electrode line and the first pad;
a second routing line connected to the second touch line at a second side of display area that is opposite first side, the second routing line transmitting a second signal that is different from the first signal between the second routing line and the second pad; and
a first guard line between the first side of the display area and the first routing line, the first guard line supplied with a third signal that substantially matches the second signal.

10. The touch display apparatus of claim 9, further comprising:
a second guard line between the second side of the display area and the second routing line, the second guard line supplied with a fourth signal that substantially matches the first signal.

11. The touch display apparatus of claim 10, wherein the first signal is a touch driving signal applied to the first touch electrode line and the second signal is a touch sensing signal received from the second touch electrode line,
wherein the third signal applied to the first guard line substantially matches the touch sensing signal and the fourth signal applied to the second guard line substantially matches the touch driving signal.

12. The touch display device of claim 10, wherein the first guard line surrounds a plurality of sides of the display area except for the second side of the display area in a plan view of the touch display device.

13. The touch display device of claim 12, wherein the second guard line is at the second side of the display area but not at remaining sides from the plurality of sides of the display area in the plan view of the touch display device.

14. The touch display device of claim 10, wherein the first guard line intersects the first routing line and the second guard line intersects the second routing line.

15. The touch display device of claim 10, further comprising:

a first power voltage supply line including a first portion at the first side of the display area and a second portion at the second side of the display area;
a third guard line between the first portion of the first power supply voltage supply line and the first guard line; and
a fourth guard line between the second portion of the first power supply voltage supply line and the second guard line,
wherein third driving guard line is applied a signal that is a same as the first signal applied to the first touch electrode line, and the fourth driving guard line is applied a signal that is a same as the second signal applied to the second touch electrode line.

16. A touch display apparatus comprising:
a substrate including a display area;
a transistor on the display area;
a light emitting device on the display area, the light emitting device electrically connected to the transistor;
a touch sensor on the light emitting element, the touch sensor configured to sense touch of the touch display apparatus;
a first routing line connected to the touch sensor, the first routing line configured to apply a touch driving signal to the touch sensor;
a second routing line connected to the touch sensor, the second routing line configured to receive a touch sensing signal from the touch sensor; and
a guard line that intersects one of the first routing line or the second routing line and is applied a signal that substantially matches one of the touch driving signal or the touch sensing signal, the guard line including a same material as at least part of the touch sensor.

17. The touch display apparatus of claim 16, wherein the guard line intersects the first routing line and the signal substantially matches the touch sensing signal.

18. The touch display apparatus of claim 16, wherein the guard line intersects the second routing line and the signal substantially matches the touch driving signal.

19. The touch display apparatus of claim 16, wherein the guard line comprises a first conductive layer and a second conductive layer that is on the first conductive layer, the second conductive layer and the first conductive layer electrically connected to each other.

20. The touch display apparatus of claim 19, wherein the touch sensor includes a plurality of touch electrodes, at least one of the plurality of touch electrodes made of a same material as the second conductive layer.

* * * * *